Patented Apr. 7, 1970

3,505,317
16-METHYLENE-21-FLUORO-STEROIDS OF THE PREGNANE SERIES
David Taub, Metuchen, N.J., assignor to Merck & Co., Inc., Rahway, N.J., a corporation of New Jersey
No Drawing. Filed Dec. 29, 1966, Ser. No. 605,586
Int. Cl. C07c *173/00*
U.S. Cl. 260—239.55                                5 Claims

ABSTRACT OF THE DISCLOSURE

The invention disclosed herein is concerned with a novel process for making 21-fluoro-steroids. More particularly, it relates to a synthetic method for making 21-fluoro-6-methyl-16-methylene-17α-acetoxy-pregna - 4,6-diene-3,20-dione which possesses progestational activity, and is valuable as an estrus regulating agent. In the new method, 3-acetoxy - 6,16 - dimethyl-pregna-5,16-diene-20-one is reacted with isopropenyl acetate in the presence of p-toluene sulfonic acid to produce the corresponding 20-enol acetate, 3,20-diacetoxy-6,16-dimethyl-pregna-5,16,20-triene which is then reacted with N-iodosuccinimide to form the corresponding 21-iodo-20-keto-steroid; the latter, upon reaction with silver fluoride, is converted to the corresponding 21-fluoro derivative, 21-fluoro-3-acetoxy-6,16-dimethyl-pregna-5,16-diene-20-one, which is reacted with alkaline hydrogen peroxide thereby forming 3-hydroxy-21-fluoro-16α,17α-oxido-6,16β-dimethyl-pregn-5-ene-20 - one which, upon oxidation of the 3-hydroxy group, is converted to 21-fluoro-16α,17α-oxido-6α,16β-dimethyl-pregn-4-ene-3,20-dione; upon treatment of this 16α,17α-oxido compound with trifluoroacetic acid, there is obtained 21 fluoro-16-methylene-17α-hydroxy-6α-methyl-pregn-4 - ene-3,20-dione which is reacted with acetic anhydride in the presence of perchloric acid to form 21-fluoro-3,17α-diacetoxy-16-methylene-6-methyl-pregna-3,5-diene-20 - one; this last-named compound is then reacted with chloranil to form 21-fluoro-6-methyl-16-methylene-17α-acetoxy-pregna-4,6-diene-3,20-dione.

---

The reaction between the 3-acetoxy-6,16-dimethyl-pregna-5,16-diene-20-one and isopropenyl acetate to form the 20-enol acetate is ordinarily conducted by heating the reactants together under reflux for a period of about 8 hours in the presence of a strong acid catalyst, such as p-toluene sulfonic acid. The resulting mixture is evaporated substantially to dryness, the residual material is dissolved in ether and neutralized to pH approximately 8–9 with aqueous potassium bicarbonate, and the steroid recovered from the ether solution.

The reaction between the resulting 20-enol acetate and the N-iodosuccinimide is conveniently carried out in solution in dioxane at approximately room temperature; under these conditions, the iodination reaction is ordinarily substantially complete in about 5–6 hours. The 21-iodo-20-keto-steroid thus produced is recovered by evaporating the reaction solution under vacuum to a thick slurry, adding methanol and recovering the precipitated material by filtration. The conversion of the 21-iodo substituent to 21-fluoro is achieved by heating a solution of the 21-iodo-20-keto-steroid in acetonitrile with silver fluoride under conditions such that the silver fluoride is slowly dissolved in the reaction solution; this is conveniently effected by heating the acetonitrile solution of the steroid under reflux in a Soxhlet extraction apparatus containing the silver fluoride in the thimble. The reaction mixture is filtered, thereby removing the precipitated silver iodide, and the filtered solution is evaporated to dryness under vacuum; the residual material is purified by crystallization from methanol to give substantially pure 21-fluoro-3-acetoxy-6,16-dimethyl-pregna-5,16-diene-20-one.

The 21 - fluoro-3-acetoxy-6,16-dimethyl-pregna-5,16-diene-20-one is then dissolved in methanol and to this solution is added with stirring an aqueous methanolic solution of sodium hydroxide and hydrogen peroxide, while maintaining the resulting mixture approximately room temperature. Under these conditions the reaction is ordinarily substantially complete in about 20 hours, at the end of which time the methanolic reaction mixture is evaporated to a small volume under vacuum. Addition of water produces a white precipitate, which is recovered by filtration to give 3-hydroxy-21-fluoro-16α,17α-oxido-6,16β-dimethyl-pregn-5-ene-20-one.

The Oppenauer oxidation of the 3-hydroxy substituent in the latter compound is conveniently carried out by forming a dry solution of the 3-hydroxy-21-fluoro-16α,17α-oxido-6,16β-dimethyl-pregn-5-ene-20-one and cyclohexanone in toluene, replacing any air present by nitrogen, and heating and stirring the resulting mixture at reflux temperature while adding thereto a solution of aluminum isopropoxide catalyst over a period of about 20 minutes. During the addition a portion of the refluxing solution is allowed to distill at a rate approximately one drop per second, and this rate of distillation is continued for an additional period of about 30 minutes following the addition of the aluminum isopropoxide. To the reaction mixture is then added aqueous sodium potassium tartrate solution, the resulting mixture is further diluted with water, and the aqueous-toluene mixture is then evaporated nearly to dryness under vacuum; additional water and toluene are added, and the resulting mixture again evaporated under vacuum substantially to dryness. The residual material is dissolved in benzene and, after washing with aqueous sodium chloride solution and drying, the benzene solution is evaporated to dryness under vacuum to give the 3-keto-steroid, 21-fluoro - 16α,17α - oxido-6α,16β-dimethyl-pregn-4-ene-3,20-dione.

The reaction of the 21-fluoro-16α,17α-oxido-6α,16β-dimethyl-pregn-4-ene-3,20-dione with trifluoroacetic acid is conveniently conducted by bringing the reactants together in cold benzene solution, and then allowing the resulting mixture to warm to room temperature, at which temperature it is maintained for approximately 24 hours. The trifluoroacetic acid is neutralized by pouring the reaction mixture into aqueous bicarbonate solution and the steroid is extracted from the aqueous mixture with benzenether. The organic extract is washed with aqueous sodium chloride solution, dried, and evaporated to dryness to give 21-fluoro-16-methylene - 17α-hydroxy-6α-methyl-pregn-4-ene-3,20-dione. The 21-fluoro-16-methylene-17α-hydroxy-6α-methyl-pregn-4-ene-3,20-dione is dissolved in ethyl acetate, and the solution treated with acetic anhydride and perchloric acid at a temperature of about 10° C. The resulting mixture is allowed to stand for about 30 minutes at about 20 to 25° C., and is then added to excess cold aqueous potassium bicarbonate solution, thereby neutralizing excess acid. The organic layer is repeatedly extracted, first with aqueous potassium bicarbonate solution and secondly with aqueous sodium chloride solution; the organic layer is then dried and evaporated under vacuum to give 21-fluoro-3,17α-diacetoxy-16-methylene-6-methyl-pregna-3,5-diene-20-one.

The dehydrogenation of the 21-fluoro-3,17α-diacetoxy-16-methylene - 6-methyl-pregna - 3,5-diene-20-one with chloranil is carried out by bringing the reactants together in ethyl acetate solution containing acetic acid and a small amount of sulfosalicylic acid catalyst, and heating the resulting solution under reflux for a period of about 24 hours. The reaction mixture is cooled, dried with ether, extracted first with water and finally with aqueous sodium hydroxide solution. The organic layer is then dried and evaporated under vacuum to give 21-fluoro-17α-acetoxy-16-methylene-6-methyl-pregna-4,6-diene-3,20-dione.

The following examples illustrate methods of carrying out the present invention but it is to be understood that these examples are given for purposes of illustration and not of limitation.

EXAMPLE 1

A stirred solution of 50 g. of 3β-acetoxy-6,16-dimethyl-pregna-5,16-diene-20-one and 6 g. of p-toluene sulfonic acid monohydrate in 600 ml. of isopropenyl acetate is heated to reflux and then distilled through a Vigreux column at a rate of about 40–50 ml. per hour. After 8 hours, the mixture is evaporated nearly to dryness under vacuum. Toluene (50 ml.) is added, and the mixture is again evaporated nearly to dryness. Ether is then added followed by concentrated aqueous potassium bicarbonate solution until pH 8–9 is attained. The ether extract is washed with saturated aqueous sodium chloride, dried over magnesium sulfate and concentrated to dryness. Crystallization of the residue from methanol gives 36 g. of 3β,20-diacetoxy - 6,16-dimethyl-pregn - 5,16,20-triene; M.P. 121–123° C.

EXAMPLE 2

To a solution of 21.3 g. of 3β,20-diacetoxy-6,16-dimethyl-pregn-5,16,20-triene in 100 ml. of dioxane, maintained under nitrogen, is added 12 g. of N-iodosuccinimide and 20 ml. of dioxane. The mixture is stirred 5–6 hours at a temperature of approximately 23–25° C., and is then evaporated under vacuum to a thick slurry. Methanol (50 ml.) is added, and the resultant heavy precipitate is recovered by filtration, washed twice with a little cold methanol, and dried to give approximately 20 g. of 21-iodo-3β-acetoxy - 6,16-dimethyl-pregna - 5,16-dione-20-one; M.P. 121–125° C. dec.

EXAMPLE 3

Silver fluoride (25.7 g.) is placed in the thimble of a Soxhlet extraction apparatus, in the pot of which is placed a solution of 13.4 g. of 21-iodo-3β-acetoxy-6,16-dimethyl-pregna-5,16-diene-20-one in 500 ml. of acetonitrile. The acetonitrile sollution of the steroid is heated under reflux with stirring whereupon the silver fluoride is slowly dissolved by the refluxing acetonitrile. After 24 hours, the reaction mixture is filtered, and the filtered solution evaporated to dryness under vacuum. The residual material is dissolved in methylene chloride, and the solution is thoroughly washed with water, then with saturated aqueous sodium chloride solution, dried over magnesium sulfate, and then evaporated to dryness under vacuum. Crystallization of the residual material from methanol gives approximately 8 g. of 21-fluoro-3β-acetoxy-6,16-dimethyl-pregna-5,16-diene-20-one; M.P. 147–150° C.

EXAMPLE 4

To a stirred solution of 4.90 g. 21-fluoro-3β-acetoxy-6,16-dimethyl-pregna - 5,16-diene-20-one in 250 ml. of methanol, maintained at 20° C., is added 25 ml. of 30% aqueous hydrogen peroxide and 5.9 ml. of 30% aqueous sodium hydroxide in 45 ml. of methanol, and the mixture is allowed to stand at approximately 20° C. for a period of about 20 hours. The reaction mixture is evaporated to a small volume under vacuum, water is added, and the resulting aqueous mixture is maintained at 0° C. for about two hours. The copious white precipitate is recovered by filtration, washed and purified by recrystallization from ethanol to give approximately 4 g. of 21-fluoro - 16α,17α-oxido - 6,16β-dimethyl-pregn-5-ene-3β-ol-20-one; M.P. 133–134° C.

EXAMPLE 5

To a solution of about one gram of 21-fluoro-16α,17α-oxido - 6,16β-dimethyl-pregn-5-ene - 3β-ol-20-one in 45 ml. of toluene is added 8 ml. of distilled cyclohexanone. Air is displaced by nitrogen, resulting mixture is stirred and heated to reflux temperature, and subjected to slow distillation until 10 ml. of distillate is collected. A solution of approximately 650 mg. of aluminum isopropoxide in 12 ml. of dry toluene is added over a 20 minute period, while maintaining a distillation rate of about 1 drop/second; after an additional 30 minutes of slow distillation, the reaction mixture is cooled, 10 ml. of a concentrated aqueous Rochelle salt solution is added, and the mixture then subjected to steam distillation under vacuum thereby evaporating organic solvent; the resulting aqueous mixture is finally evaporated nearly to dryness under vacuum. The residual material is dissolved in benzene, and the benzene solution washed with saturated aqueous sodium chloride solution, dried over magnesium sulfate, and evaporated to dryness under vacuum, to give 21-fluoro-16α, 17α-oxido - 6α,16β-dimethyl-pregn-4-ene-3,20-dione; M.P. 150–160° C.

EXAMPLE 6

To a solution of 1.13 g. of 21-fluoro-16α,17α-oxido-6α,16β-dimethyl-pregn-4-ene-3,20-dione in 24 ml. of benzene at 10° C. is added a solution of 4 ml. of trifluoroacetic acid in 10 ml. of benzene. The mixture is kept at room temperature for approximately 24 hours. The reaction mixture is then poured into excess 10% aqueous potassium bicarbonate solution, and the aqueous mixture repeatedly extracted with a 1:1 benzene-ether solution. The organic extract is washed with saturated aqueous sodium chloride solution, dried over magnesium sulfate, evaporated to dryness, and the residual material crystallized from ether to give 21-fluoro-17α-hydroxy-16-methylene-6α-methyl-pregn-4-ene-3,20-dione; M.P. 192–204° C.

EXAMPLE 7

Acetylation reagent solution is prepared as follows: 0.1 ml. of 70% aqueous perchloric acid is added to 50 ml. of ethyl acetate; ten ml. of this solution is added to a mixture of 30 ml. of ethyl acetate and 9.6 ml. of acetic anhydride; ethyl acetate is then added to make the volume 50 ml.

To a stirred solution of 400 mg. of 21-fluoro-17α-hydroxy - 16 - methylene - 6α - methyl - pregn - 4 - ene - 17α-ol-3,20-dione in 20 ml. of ethyl acetate at 10° C. is added 20 ml. of the aforesaid acetylation reagent solution.The resulting mixture is maintained at a temperature of about 20–25° C. for approximately 30 minutes, and the reaction solution is added to excess cold 5% aqueous potassium bicarbonate solution. The aqueous mixture is stirred for about 15 minutes, and the organic layer is separated, extracted three times with 5% aqueous potassium bicarbonate solution, once with saturated aqueous sodium chloride solution, dried over magnesium sulfate, and evaporated to dryness under vacuum. The reseidual material is triturated with ether to give crystalline 21 - fluoro - 3,17α - diacetoxy - 16 - methylene - 6 - methyl-pregn-3,5-diene-20-one; M.P. 122–130° C.

EXAMPLE 8

A mixture of 420 mg. of 21-fluoro-3,17α-diacetoxy-16-methylene-6-methyl-pregn-3,5-diene-20-one, 840 mg. of chloranil, 8 mg. of sulfosalicyclic acid dihydrate, 10 ml. of ethyl acetate and 2.1 ml. of acetic acid is heated under reflux with stirring for a period of approximately 24 hours. The mixture is cooled, diluted with ether, and the ethereal solution reaction extracted once with water and 5 times with cold 5% aqueous sodium hydroxide solution. The organic layer is separated, washed with saturated aqueous sodium chloride solution, dried over magnesium sulfate, and evaporated to dryness under vacuum. The residual material is crystallized from ether-acetone to give 21 - fluoro - 17α - acetoxy - 16 - methylene - 6-methyl-pragna-4,6-diene-3,20-dione; M.P. 240–245° C.

Various changes and modifications may be made in carrying out the present invention, without departing from the spirit and scope thereof. Insofar as these changes and modifications are within the purview of the annexed claims they are to be considered as part of this invention.

What is claimed is:

1. The process which comprises reacting 3-acetoxy-6,16-dimethyl-pregna-5,16-diene-20-one with isopropenyl acetate in the presence of p-toluene-sulfonic acid to produce 3,20 - diacetoxy - 6,16 - dimethyl - pregna - 5,16,20-triene; reacting the latter compound with N-iodosuccinimide to form 3-acetoxy-6,16-dimethyl-21-iodo-pregna-5,16-diene-20-one which is then reacted with silver fluoride to form 3-acetoxy-6,16-dimethyl-21-fluoro-pregna-5,16-diene-20-one; reacting the last-named compound with alkaline hydrogen peroxide thereby forming 3-hydroxy-16α,17α - oxido - 6,16β - dimethyl - 21 - fluoro - pregn - 5-ene-20-one; reacting the 3-hydroxy-16α,17α-oxido-6,16β-dimethyl - 21 - fluoro - pregn - 5 - ene - 20 - one with cyclohexanone in the presence of aluminum isopropoxide to produce 16α,17α - oxido - 6α,16β - dimethyl-21-fluoro-pregn-4-ene-3,20-dione which is reacted with trifluoroacetic acid to form 6α-methyl-16-methylene-17α-hydroxy-21-fluoro-pregn-4-ene-3,20-dione; reacting the latter compound with acetic anhydride in the presence of perchloric acid to form 3,17α-diacetoxy-6-methyl-16-methylene-21-fluoro-pregna-3,5-diene-20-one which, upon reaction with chloranil, is converted to 6-methyl-16-methylene-17α-acetoxy-21-fluoro-pregna-4,6-diene-3,20.

2. A 20-keto-steroid which has the chemical name 3 - acetoxy - 6,16 - dimethyl - 21 - fluoro - pregna - 5,16-diene-20-one.

3. A 20-keto-steroid which has the chemical name 3 - hydroxy - 16α,17α - oxido - 6,16β - dimethyl - 21-fluoro-pregn-5-ene-20-one.

4. A 20-keto-steroid which has the chemical name 3,17α - diacetoxy - 6 - methyl - 16 - methylene - 21 -fluoro-pregna-3,5-diene-20-one.

5. A 20-keto-steroid which has the chemical name 6 - methyl - 16 - methylene - 17α - acetoxy - 21 - fluoro-pregna-4,6-diene-3,20-dione.

References Cited
UNITED STATES PATENTS

| | | | |
|---|---|---|---|
| 2,791,593 | 5/1957 | Djerassi et al. | 260—397.47 |
| 3,194,803 | 7/1965 | Colton | 260—239.57 |
| 3,207,768 | 9/1965 | Nathansohn et al. | 260—397.47 |
| 3,312,692 | 4/1967 | Oliveto et al. | 260—239.5 |

ELBERT L. ROBERTS, Primary Examiner

U.S. Cl. X.R.
260—397.47, 999